(12) United States Patent
Kanazawa et al.

(10) Patent No.: US 7,117,002 B2
(45) Date of Patent: Oct. 3, 2006

(54) MOBILE COMMUNICATION SYSTEM AND METHOD HAVING BASE STATION DEPENDENT MODE AND A DIRECT MODE

(75) Inventors: Masayuki Kanazawa, Kodaira (JP); Masaru Adachi, Kodaira (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 448 days.

(21) Appl. No.: 10/403,276

(22) Filed: Apr. 1, 2003

(65) Prior Publication Data
US 2003/0186721 A1    Oct. 2, 2003

(30) Foreign Application Priority Data
Apr. 2, 2002    (JP)    ............................. 2002-100210

(51) Int. Cl.
*H04Q 7/28*    (2006.01)
(52) U.S. Cl. ..................... 455/519; 455/521; 455/445
(58) Field of Classification Search ............... 455/521, 455/519; 445/445
See application file for complete search history.

(56) References Cited

U.S. PATENT DOCUMENTS

| | | | | |
|---|---|---|---|---|
| 4,056,779 A | * | 11/1977 | Toler ......................... | 455/11.1 |
| 4,517,561 A | * | 5/1985 | Burke et al. ................ | 340/7.21 |
| 4,646,345 A | * | 2/1987 | Zdunek et al. .............. | 455/509 |
| 5,740,532 A | * | 4/1998 | Fernandez et al. ......... | 455/404.1 |
| 6,691,172 B1 | * | 2/2004 | Clow et al. ................. | 709/246 |

FOREIGN PATENT DOCUMENTS

| | | |
|---|---|---|
| JP | 7162935 | 6/1995 |
| JP | 9307494 | 11/1997 |
| JP | 2000151497 | 5/2000 |
| JP | 2000269985 | 9/2000 |
| JP | 200244102 | 2/2002 |
| JP | 200295059 | 3/2002 |
| WO | 0122755 | 3/2001 |

OTHER PUBLICATIONS

"Narrow Band Digital Telecommunication System", ARIB STD-T61, Association of Radio Industries and Business, May 1999, pp. 3, 5, 14, 16, 35, 36, 37 and 40.

* cited by examiner

*Primary Examiner*—Nick Corsaro
*Assistant Examiner*—Alejandro Rivero
(74) *Attorney, Agent, or Firm*—Mattingly, Stanger, Malur & Brundidge, P.C.

(57) ABSTRACT

A mobile communication system, and method, having, in an operational area of the base station, a plurality of mobile stations each capable of operating in an arbitrary one of two kinds of communication mode, i.e., a base station dependent mode for conducting communication via a base station and a direct communication mode for conducting direct communication between mobile stations. Information containing an important message to be received by all mobile stations is transmitted from the base station in the base station dependent mode. Upon receiving the information containing the important message, a mobile station placed in the base station dependent mode transmits the information containing the important message in the direct communication mode. As a result, all mobile stations placed in the direct communication mode receive the important message.

17 Claims, 6 Drawing Sheets

●──▶ REPRESENT ORIGINATION SOURCE AND DESTINATION OF INFORMATION

MOBILE COMMUNICATION SYSTEM AND METHOD HAVING BASE STATION DEPENDENT MODE AND A DIRECT MODE

BACKGROUND OF THE INVENTION

The present invention relates to a mobile communication system having a base station and a plurality of mobile stations, and in particular to a mobile communication system having a direct communication mode between mobile stations and a communication method therefor.

In the field concerning business radio communication in Japan, introduction of a narrow band digital radio communication technique using the SCPC (Single Channel Per Carrier) scheme is advanced in recent years for the purpose of using radio frequencies efficiently. The SCPC system is described in "Narrow Band Digital Telecommunication System (SCPC/FDMA)". ARIB STD-T61, published by Association of Radio Industries and Business, May 1999, pages 3, 5, 14, 16, 35, 36, 37 and 40.

Therefore, an example of a mobile communication system using the narrow band digital radio communication technique will now be described roughly. In the system, an operational area (zone) indicated by a broken line is first formed by constructing a base station (radio equipment) having, for example, a command console or an operator console (equipment) as shown in FIG. 6.

And, by the construction of the operational area, operation of mobile communication among a plurality of mobile stations (terminals), such as, for example, A, B, C, D and E as illustrated is made possible therein. As for this system, operation using two kinds of, i.e., first and second communication modes described below are conventionally known.

In the first communication mode, radio carriers f1 and f2 serving as a pair of up-link and down-link carriers are assigned to the base station. By using these up-link and down-link carriers, communication is conducted between the base station and a mobile station, or between a mobile station and another mobile station via the base station with the press-to-talk scheme. Since operation is conducted under the control of the command console in both cases, the first communication mode is hereafter referred to as base station dependent mode.

By the way, the press-to-talk scheme is one communication scheme of radio machines, and refers to a scheme in which transmission is conducted by using one transmission line alternately in a time division manner (simplex scheme). Usually the radio machine is set to the reception state. When transmission is desired, a press button of the radio machine is pressed to conduct transmission. Therefore, it is called press-to-talk scheme. A plurality of radio machines share one transmission (frequency channel). Once one radio machine starts transmission line and occupies the transmission line (this state is called busy), other radio machines cannot conduct transmission until the talk is finished.

In the second communication mode, both mobile stations use a carrier f3 for direct communication, and communication is conducted between the mobile stations without interposition of the base station. Communication mode switching in the mobile station is typically conducted manually. Hereafter, it is referred to as direct communication mode.

In such a system, however, the base station dependent mode is typically the original communication mode, and this mode is the basis. In many cases, therefore, the direct communication mode is added as an option.

Referring back to FIG. 6, the radio carrier f1 serving as a transmission wave of the base station (or a reception wave of a mobile station) is called down-link carrier, and the radio carrier f2 serving as a transmission wave of the mobile station (or a reception wave of the base station) is called up-link carrier. The up-link carrier and the down-link carrier form a pair.

As for frequency relations of the radio carriers with the up-link carrier and the down-link carrier paired off, paired carriers f1 and f2 related by an offset frequency $\Delta f$ are selected respectively from a down-link band F1 and an up-link band F2 as shown in FIG. 7. On the other hand, as for the carrier f3 for direct communication, one carrier included in the up-link band F2, which is not used by the base station, is selected.

SUMMARY OF THE INVENTION

Operation of the base station and mobile stations in the narrow band digital communication system will now be described with reference to communication sequences shown in FIGS. 8A and 8B. FIG. 8A shows an example of a sequence of a press-to-talk transmission operation from the base station to a mobile station in the base station dependent mode. FIG. 8B shows an example of a sequence of a press-to-talk transmission operation from a mobile station to another mobile station in the direct communication mode.

In the base station dependent mode, at the beginning, the base station continuously transmits an idle signal, which does not include message information, by using the down-link carrier f1 as shown in FIG. 8A. When transmitting a message requested from the command console by voice or data and when receiving an upward message supplied from a mobile station and transmitting the upward message on a down-link wave, a call originating operation using the press-to-talk scheme is started.

As shown in FIG. 8A, the call originating operation becomes the operation of stopping the transmission of the idle signal, then transmitting a synchronization signal and a message in the cited order, finally transmitting an idle signal, and notifying on-hook. As a result, all mobile stations (for example, the mobile stations A, D and E shown in FIG. 6) operating in the operational area according to the base station dependent mode first synchronizes with the down-link carrier f1 transmitted from the base station, and then receives a message transmitted at this time.

On the other hand, when a transmission request (ON operation of a press button) is given by an operator as shown in FIG. 8B, a mobile station (for example, the mobile station B) operating in the direct communication mode starts call originating (press-to-talk) operation by using the carrier f3 for direct communication, transmits a synchronization signal and a message in the cited order, finally transmitting an idle signal, and notifies on-hook.

As a result, another station (for example, the mobile station C) operating in the operational area according to the direct communication mode at this time first synchronizes with the direct communication carrier f3, which is obtained by the call origination conducted by the mobile station B, and then receives the message.

The mobile station that is switched to the direct communication mode and operating in the direct communication mode loses cooperation with the base station and the command console during that time. In the above described system, this point is not taken into account, resulting in a problem that simultaneous notification operation is lost.

In the utilization field of business radio, public institutions, such as institutions of fire fighting, gas, waterworks and electric power, are also included. For example, it becomes necessary to notify simultaneously all mobile stations of an important message such as, for example, an emergency alarm at the time of a disaster, from the command console. Herein, the important message at this time is referred to as simultaneous emergency call information, and operation at this time is referred to as simultaneous emergency call operation.

If a mobile station that is in the direct communication mode exists in the above described system at that time, however, then the important message is not transmitted to that mobile station. Because of occurrence of this situation, the simultaneous emergency call operation is lost.

An object of the present invention is to provide a mobile communication system and a communication method therefor capable of certainly conducting simultaneous emergency call operation on a mobile station that is operating (standby or waiting) in the direct communication mode.

In accordance with one aspect of the present invention, a communication method for a mobile communication system having a plurality of mobile stations each capable of operating in an arbitrary one of two kinds of communication mode, i.e., a base station dependent mode for conducting communication via a base station and a direct communication mode for conducting direct communication between mobile stations, in an operational area of the base station includes the steps of: transmitting information containing an important message to be received by all mobile stations, from the base station in the base station dependent mode, receiving the information in one or more first mobile stations placed in the base station dependent mode; transmitting the important message in the direct communication mode from one of the first mobile stations that have received the information; and receiving the important message in one or more second mobile stations placed in the direct communication mode.

In accordance with a preferable feature of the present invention, in the base station dependent mode communication is conducted by using a down-link carrier and an up-link carrier whereas in the direct communication mode communication is conducted by using a direct communication carrier different from the down-link carrier and the up-link carrier, and when transmitting the information by using the down-link carrier, the base station adds an information bit that indicates that the important message contained in the information is a message to be received by all mobile stations, and an identifier for specifying the one of the first mobile stations, to the important message.

In accordance with another aspect of the present invention, a mobile communication system includes: a command console; a base station connected to the command console to transmit information supplied from the command console; and a plurality of mobile stations each having two kinds of communication mode, i.e., a base station dependent mode for conducting communication via a base station and a direct communication mode for conducting direct communication between mobile stations, and capable of operating in an arbitrary one of the modes in an operational area of the base station, wherein some of mobile stations included in the plurality of mobile stations and placed in the base station dependent mode and transmits the received information in the direct communication mode, whereby all of the mobile stations included in the operational area of the base station and each placed in the direct communication mode or the base station dependent mode receive the information.

In accordance with a preferable feature of the present invention, the base station includes a control unit for adding additional information including an information bit that indicates that the information supplied from the command console contains an important message to be transmitted to all mobile stations, and an identifier for specifying a specific mobile station, to the information supplied from the command console, and transmitting resultant information, each of the plurality of mobile stations includes a control unit for transmitting the important message contained in the information supplied from the base station in the direct communication mode when the information supplied from the base station has the information bit and an identifier specifying the own station added thereto, and a mobile station included in the plurality of mobile stations and specified by the base station transmits the received important message in the direct communication mode.

Other objects, features and advantages of the invention will become apparent from the following description of the embodiments of the invention taken in conjunction with the accompanying drawings.

DESCRIPTION OF THE EMBODIMENTS

Figure 1:
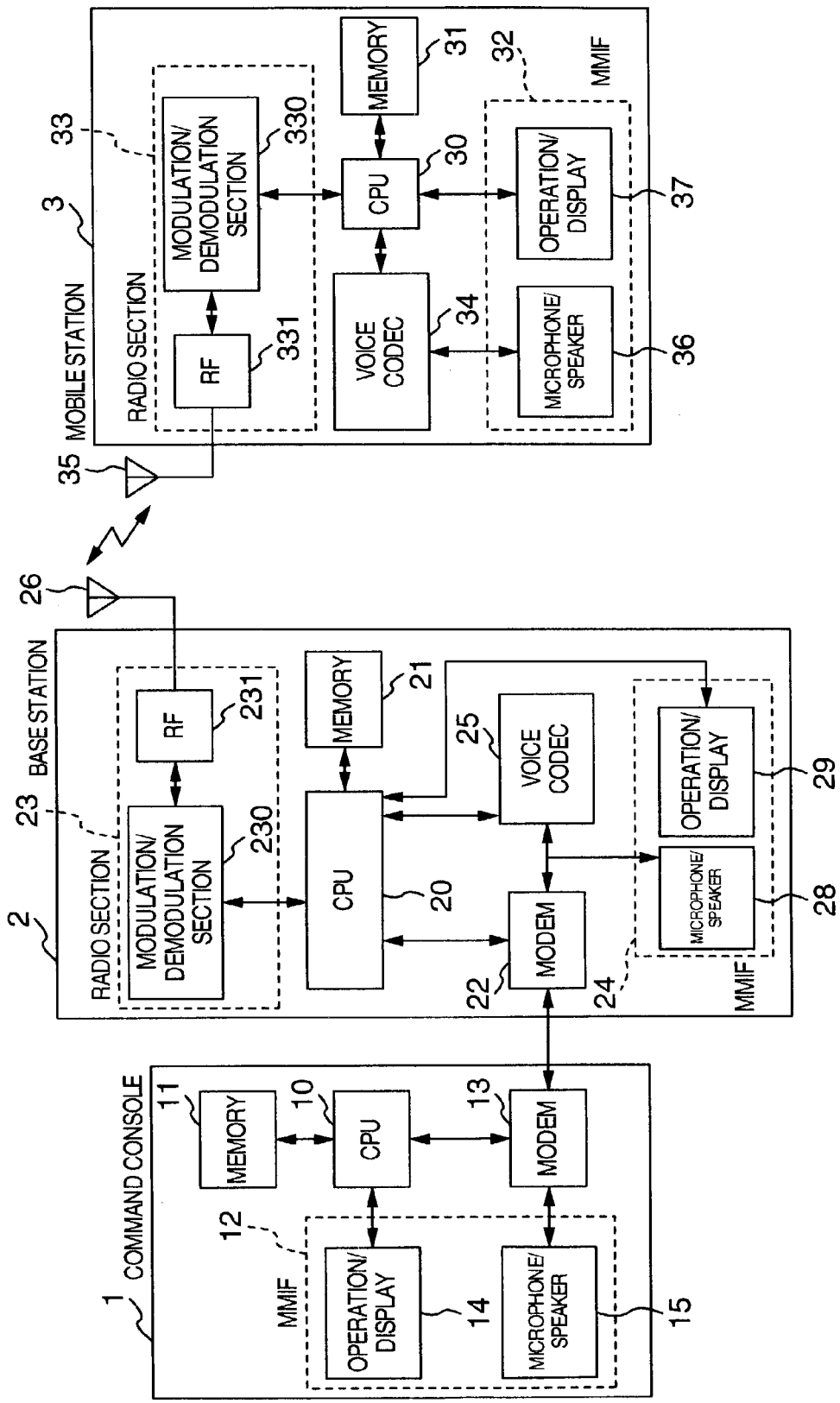
FIG. 1 is a block diagram showing a configuration of a mobile communication system according to an embodiment of the present invention.

Hereafter, embodiments of the present invention will be described with reference to the drawings. The same components are denoted by like reference characters.

A mobile communication system according to an embodiment of the present invention will now be described with reference to FIG. 1. FIG. 1 shows an example of a hardware configuration of this mobile communication system.

In FIG. 1, reference numeral 1 denotes a command console, 2 a base station, and 3 a mobile station. In FIG. 1, only one mobile station is shown and other mobile stations are omitted. As a matter of fact, however, a plurality of similar mobile stations exist in an operational area of the base station 2.

First, the command console 1 will now be described.

The command console 1 includes a central processing unit (hereafter referred to as CPU) 10, a memory 11 connected to the CPU 10, a man-machine interface (hereafter referred to as MMIF) 12, and a modem 13 connected to the CPU 10. The command console 1 is wire-connected to the base station 2 via the modem 13, and receives/transmits a signal from/to the base station 2. Operation of the whole command console 1 is conducted by a program stored in the memory 11 and executed by the CPU 10.

The MMIF 12 includes a microphone/speaker section 15 and an operation/display section 14. The microphone/speaker section 15 is connected to the modem 13, and the operation/display section 14 is connected to the CPU 10.

The operation/display section 14 includes components, such as operation keys and display lamps, which are not illustrated, and conducts operation setting for the base station 2 and displays the base station state. When transmitting a message to the base station 2, a transmission start button (press button), which is included in the operation/display section 14 and not illustrated, is pressed. The CPU 10 transmits input information supplied from the operation/display section 14 and digital data corresponding to management information in the base station to the base station 2 via the modem 13. At this time, digital data are converted to digital signals such as MSK (Minimum shift Keying) signals, and transmitted/received between modems of the command console 1 and the base station 2. When transmitting a message, i.e., when the press button is turned on, a tone signal called press tone, which has a predetermined frequency and represents that the command console is in the transmission state, is overlaid on the message and transmitted onto the line. If the message is voice at this time, then the press tone is overlaid on the voice signal and transmitted. If the message is non-voice data such as a short message, then the message is converted to a digital signal, such as an MSK (Minimum Shift Keying) signal, then the press tone is overlaid on the message, and transmitted. When receiving a message from the base station, a tone having a predetermined frequency called busy tone is overlaid on the message and transmitted from the base station. When the busy tone is detected by the modem 13, therefore, the message is output to a speaker if the message is voice, or the message is output to the display section via the CPU 10 if the message is non-voice data.

Hereafter, the base station 2 will be described.

The base station 2 includes a CPU 20, a memory 21, a modem 22, a radio section 23, a man-machine interface (MMIF) 24, a voice CODEC 25, and an antenna 26. The base station 2 is wire-connected to the command console 1 via the modem 22, and receives/transmits a signal from/to the command console 1. Furthermore, the base station 2 is radio-connected to the mobile station 3 via the antenna 26, and receives/transmits a signal from/to the mobile station 3. The radio section 23 includes a modulation/demodulation section 230 connected to the CPU 20, and a high frequency section 231 connected between the modulation/demodulation section 230 and the antenna 26. As for the modulation scheme, the $\pi/4$ shift QPSK scheme or the like can be used.

The CPU 20 receives digital data from the command console 1 via the modem 22, and conducts operation setting for the base station 2 according to contents of the digital data. Furthermore, the CPU 20 transmits digital data from the base station 2 to the command console 1 via the modem 22. When a message (voice or non-voice data) from the command console 1 is transmitted, the press tone is detected by the modem 22. If the message is voice, then the voice signal is coded to digital data by the voice CODEC 25, and the resultant digital data is converted to a predetermined transmission data format for radio transmission by the CPU 20, subjected to modulation in the modulation/demodulation section 230 included in the radio section 23, and transmitted from the antenna 26 via the high frequency section 231. If the message is non-voice data, then the message is converted to a predetermined transmission data format by the CPU 20, subjected to modulation by the modulation/demodulation section 230 in the same way, and transmitted from the antenna 26 via the high frequency section 231. When inputting voice from a microphone/speaker section 28 in the base station 2 and transmitting the voice to the mobile station 3, a transmission start button (press button) in an operation/display section 29 is pressed and voice is input, coded by a voice CODEC, and then transmitted according to the same procedure as that in the foregoing description.

At the time of data rearrangement (conversion to a transmission data format), the CPU 20 conducts formatting on an identifier (ID) described later and an information bit (described later), which indicates that the message is an important message to be transmitted to all mobile stations, and adds a result to the message.

When a radio signal from the mobile station 3 has been received via the antenna 26, the radio signal is demodulated by the modulation/demodulation section 230 in the radio section 23 and then a message is reproduced by the CPU 20. If the received message is voice data, then voice data decoding and voice reproduction are conducted by the voice CODEC 25. The reproduced voice is output to the command console 1 via the modem 22, and it is output to the speaker 28 as well. If the received message is non-voice data, then the data is output to the command console 1 via the modem 22.

The mobile station 3 will now be described.

The mobile station 3 includes a CPU 30, a memory 31 connected to the CPU 30, a man-machine interface (MMIF) 32 connected to the CPU 30, a radio section 33 connected to the CPU 30, a voice CODEC 34 connected to the CPU 30, and an antenna 35 connected to the radio section 33. The mobile station 3 is radio-connected to the base station 2 via the antenna 35, and the mobile station 3 receives/transmits a message to/from the base station 2. The radio section 33 includes a modulation/demodulation section 330 connected to the CPU 30, and a high frequency section 331 connected between the modulation/demodulation section 330 and the antenna 35. The MMIF 32 includes a microphone/speaker section 36 and an operation/display section 37. The operation/display section 37 includes components, such as operation keys and display lamps, which are not illustrated. The microphone/speaker section 36 is connected to the voice CODEC 34, and the operation/display section 37 is connected to the CPU 30. The CPU 30 controls operation of the whole mobile station by executing a program stored in the memory 31.

When a radio signal has been received, the radio signal is demodulated by the modulation/demodulation section 330 in the radio section 33 and then a message is reproduced by the CPU 30. If the received message is voice data, then voice data decoding and voice reproduction are conducted by the voice CODEC 34. The reproduced voice is output to the speaker 36. If the received message is digital data, then the data is output to the operation/display section 37. When transmitting a message in a radio manner, a transmission start button (press button), which is not illustrated, is pressed. Voice input from the microphone 36 is decoded to digital data by the voice CODEC 34, then converted to a predetermined transmission data format for radio transmission, and modulated by the modulation/demodulation section 330 in the radio section 330, and transmitted from the antenna 35. When transmitting digital data such as a short message (for example, when transmitting a number code input from the operation/display section 37), the message information is converted to a predetermined transmission data format, then modulated by the modulation/demodulation section 330 included in the radio section 33, and transmitted from the antenna 35. Switching between the base station dependent mode and the direct communication mode is conducted by using a switch which is included in the operation/display section 37 and which is not illustrated, and the CPU 30 switches over the carrier of the radio section 33. Furthermore, the CPU 30 determines whether a message received from the base station has an identifier (ID) for specifying a specific mobile station and an information bit for indicating an attribute of a message added thereto. If the message has an identifier specifying an own station added thereto and the information bit indicates that the received message is an important message to be transmitted to all mobile stations, then the CPU 30 switches the communication mode to the direct communication mode, and conducts control to transmit the important message by using a direct communication carrier f3 described later. As a result, it becomes for other mobile stations placed in the direct communication mode to receive the important message. Furthermore, after the important message is transmitted by the direct communication carrier f3 and the communication mode is returned to the base station dependent mode by the operator, the CPU 30 sets the information bit to "answer" data, sets the ID equal to the number of the own station, and conducts control to transmit the answer data by using the up-link carrier f2. As a result, it becomes possible for the base station to ascertain that processing required for simultaneous emergency call operation for all mobile stations has already been executed. By the way, a mobile station that has received the important message in the direct communication mode may set the information bit to "answer" data, sets the ID equal to the number of the own station, and notify the mobile station of the transmission source by using the direct communication mode that the mobile station has received the important message. This control is also conducted by the CPU 30.

Figure 2:
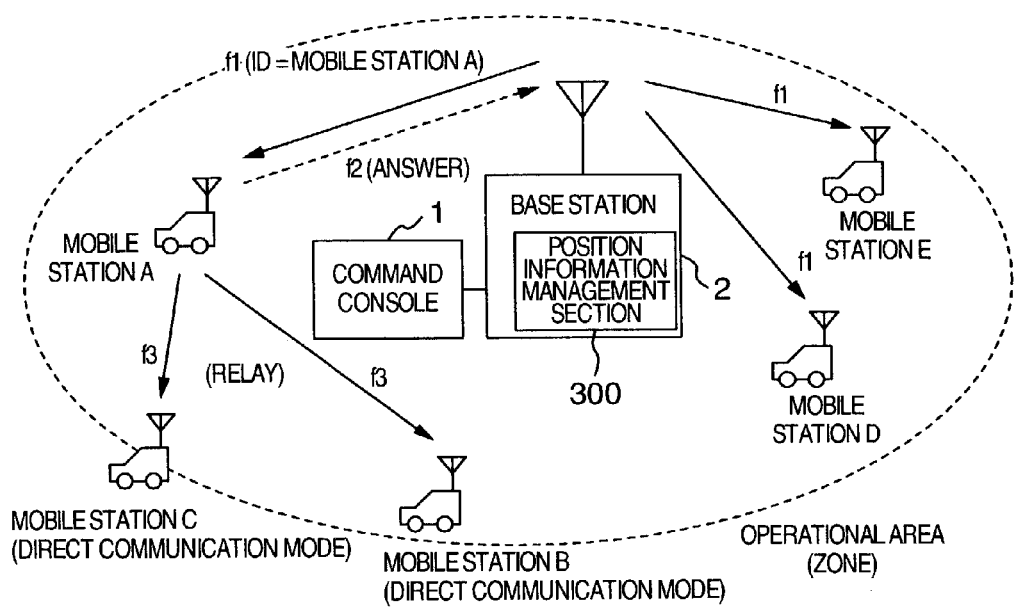
FIG. 2 is a schematic configuration diagram showing another embodiment of a mobile communication system according to the present invention.
Figure 3:
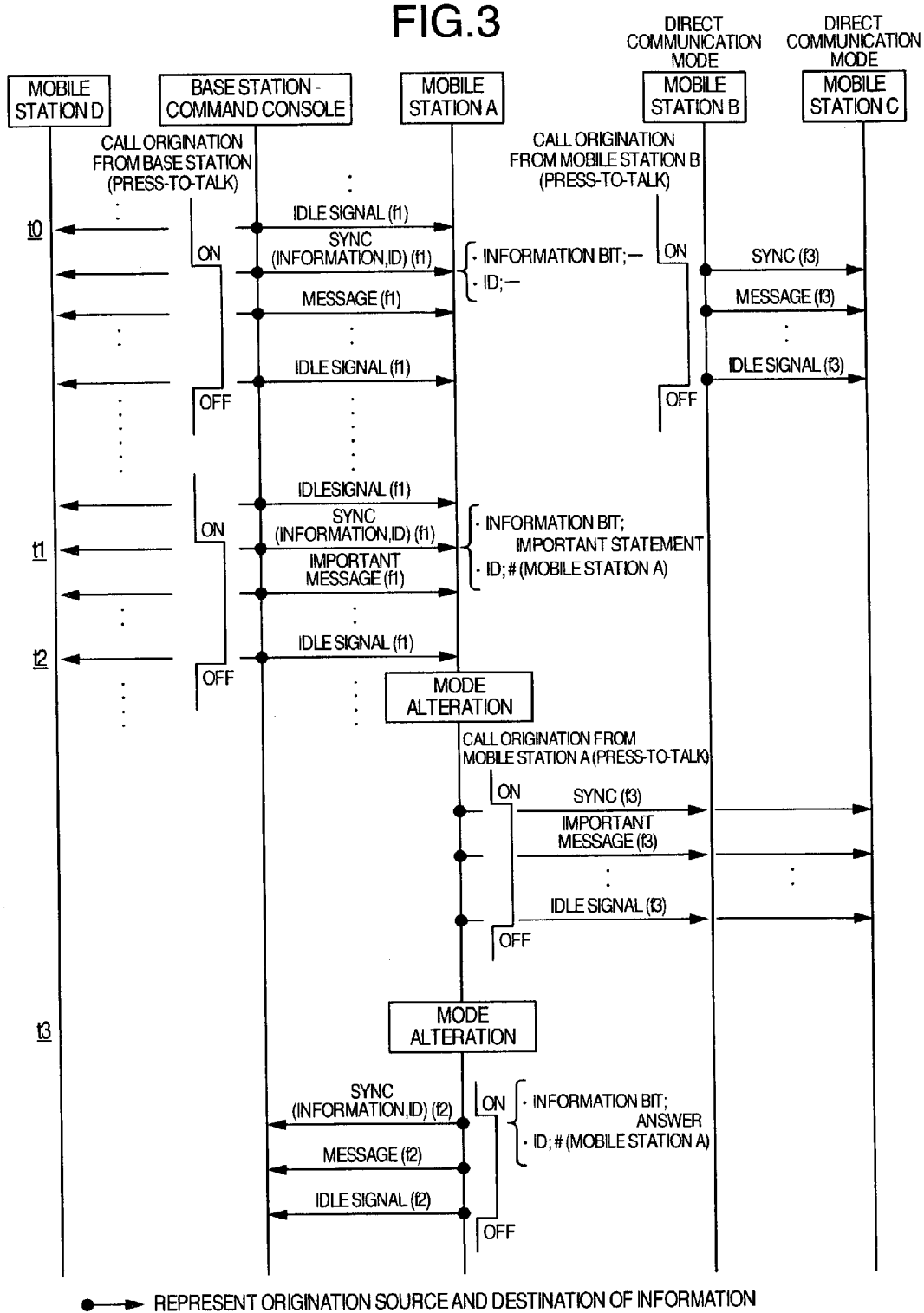
FIG. 3 is a sequence diagram for a mobile communication system shown in FIG. 2.

A mobile communication system of another embodiment according to the present embodiment will now be described with reference to FIGS. 2 and 3. FIG. 2 is a diagram showing a configuration of a mobile communication system of the present embodiment. FIG. 3 is a sequence diagram of the system.

Figure 6:
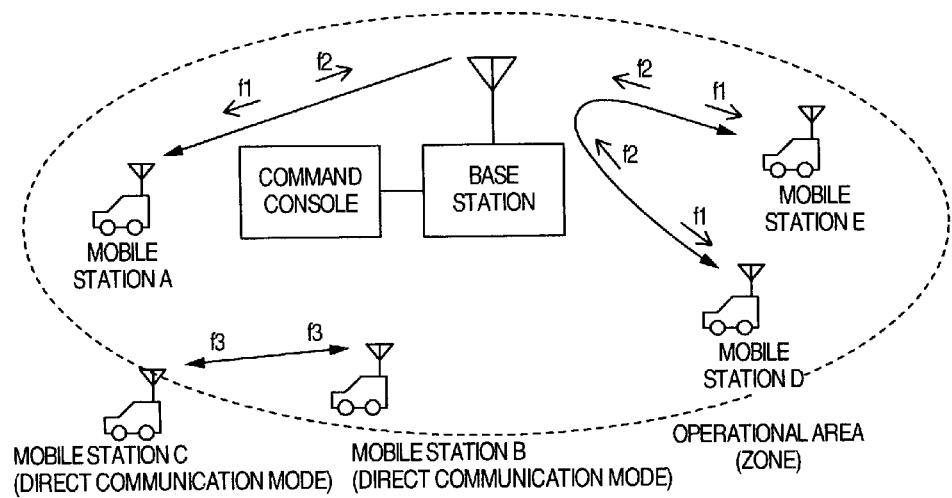
FIG. 6 is a schematic configuration diagram showing an example of a mobile communication system according to a conventional technique.

The system shown in FIG. 2 is the same as the system shown in FIG. 6 in that an operational area (zone) indicated by a broken line is formed by constructing the base station 2 having the command console 1 and a plurality of mobile stations A, B, C, D and E are provided as terminals. A position information management section 300 in the base station 2 will be described later.

Figure 7:
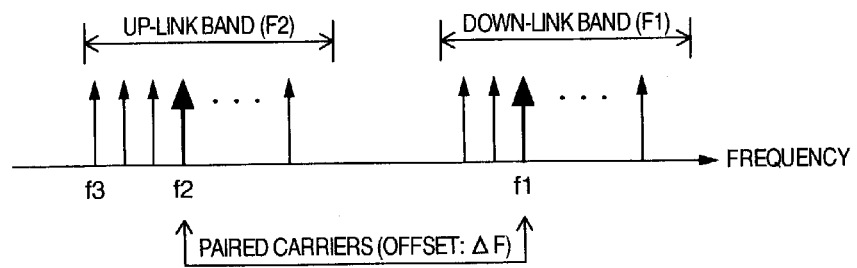
FIG. 7 is a diagram showing an example of carrier frequencies in a mobile communication system.

The system shown in FIG. 2 is the same as the system described with reference to FIG. 6 in that the base station 2 and the mobile stations A to E are operated in the two kinds of communication mode, i.e., the base station dependent mode and the direct communication mode. The down-link carrier f1 and the up-link carrier f2 at this time are also the same as those described with reference to FIG. 7. In FIG. 2 as well, the direct communication carrier f3 is set.

In the embodiment shown in FIG. 2, first, the base station 2 is provided with a function of transmitting a predetermined ID (identifier) on a synchronization signal of the down-link carrier f1. The predetermined ID refers to information for specifying a mobile station that should relay, for example, an information bit that means transmission of simultaneous emergency call information, and a desired message by using the direct communication carrier f3. In the illustrated example, the predetermined ID becomes an ID that specifies the mobile station A.

In the same way, the mobile stations A to E are provided with a function of receiving the direct communication carrier f3 and discriminating information sent by using the direct communication carrier f3, and a function of responding to an ID carried on the down-link carrier f1 and received specifying the own station by storing a received desired message in the memory 31 (see FIG. 1) and then transmitting the message with the direct communication carrier f3.

Operation of the mobile communication system of the embodiment shown in FIG. 2 will now be described with reference to a sequence diagram shown in FIG. 3. It is supposed in the ensuing description that in the mobile stations the mobile stations A, D and E operate in the base station dependent mode and the mobile stations B and C operate in the direct communication mode in the same way as the conventional technique.

Figure 8A:
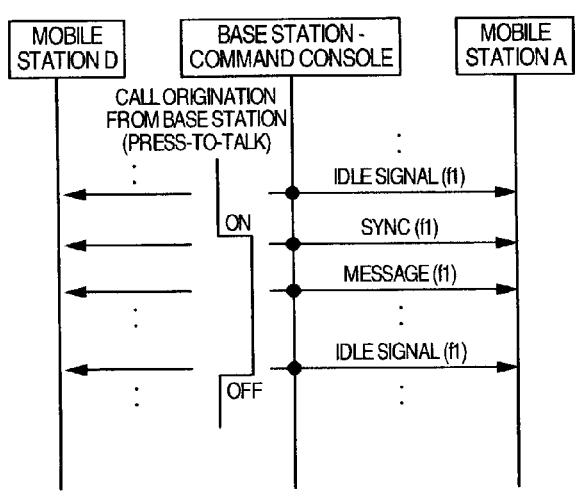
FIGS. 8A and 8B are sequence diagrams for a mobile communication system shown in FIG. 6.
Figure 8B:
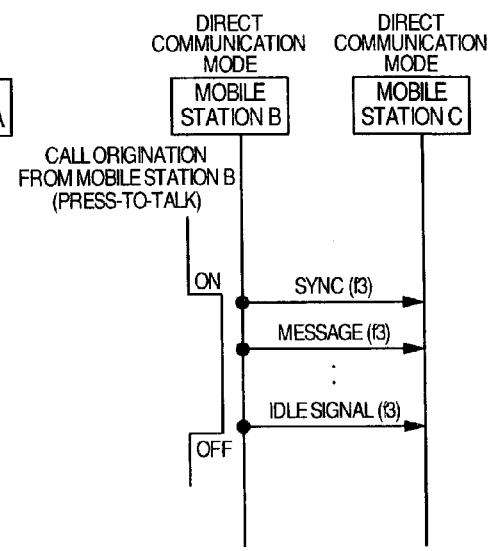

In this embodiment as well, operation is conducted according to the same communication sequence as that shown in FIG. 8 at the time of ordinary operation. And the operation at this time is shown in FIG. 3 as a situation between a certain time $t_0$ and a certain subsequent time $t_1$. At this time, neither the information bit nor the ID is placed on the synchronization signal as illustrated.

It is now supposed that an event that requires transmission of an important message to all mobile stations has occurred, for example, a situation requiring simultaneous emergency call operation has occurred, and press-to-talk operation is conducted on the command console 1 at the time $t_1$ as shown in the sequence diagram of FIG. 3. As a result, the base station conducts operation of placing an information bit that represents an "important statement" and the above described ID on a synchronizing signal of the down-link carrier f1 as illustrated and transmitting the resulting synchronization signal.

As a result, all mobile stations (mobile stations A, D and E) operating in the base station dependent mode among mobile stations operated in the operational area receive the down-link carrier f1, takes out the synchronization signal and the message, and refers to the information bit and the ID.

In a mobile station (the mobile station A in this case) having an ID (such as, for example, a number # of the mobile station) of the own station that coincides with the received ID, a message received at this time is stored in the memory and in addition, the operator is notified of this by using, for example, a beep tone or a display picture.

An operator of the mobile station A switches the mode of the own station from the base station dependent mode to the direct communication mode at subsequent time, such as, for example, time t2, reads out the above described message from the memory, and transmits the message by using the direct communication carrier f3.

Transmission of the message may be conducted automatically when the switching of the communication mode from the base station dependent mode to the direct communication mode is conducted by the operator.

As a result, this time, the above described important message is received by mobile stations (that is to say, the mobile stations B and C) that are already in the direct communication mode. Therefore, the simultaneous emergency call operation for all mobile stations inclusive of the mobile stations that are in the direct communication mode is implemented.

Thereafter, the operator of the mobile station A, i.e., the mobile station specified now by the ID restores the mode of the own station to the original base station dependent mode at time t3, sets the information bit to be placed on the synchronization signal equal to "answer" data, sets the ID to the number # of the own station, and conducts transmission by using the up-link carrier f2, so that it may be ascertained at the base station that processing required for the simultaneous emergency call operation for all mobile stations has been already executed.

By the way, transmission of the "answer" data may be conducted automatically when the switching of the communication mode to the base station dependent mode is conducted by the operator.

If as a result there is no answer from the mobile station specified by the ID (for example, the mobile station A), the base station 2 alters the ID of the mobile station at that time to a number # of another mobile station, such as, for example, a number # of the mobile station D, and conducts the transmission operation again repeatedly.

According to this embodiment, therefore, it becomes to notify all mobile stations in the operational area (zone) of the base station 2 of the important message from the command console 1 irrespective of the communication modes of the mobile stations. As a result, the simultaneous emergency operation is easily enabled for a mobile radio system operating in two kinds of communication mode, i.e., the base station dependent mode and the direct communication mode.

Furthermore, according to this embodiment, the simultaneous emergency call can be implemented certainly by repeating the transmission operation again. As a result, reliability of the simultaneous emergency call operation can be further improved.

Figure 4:
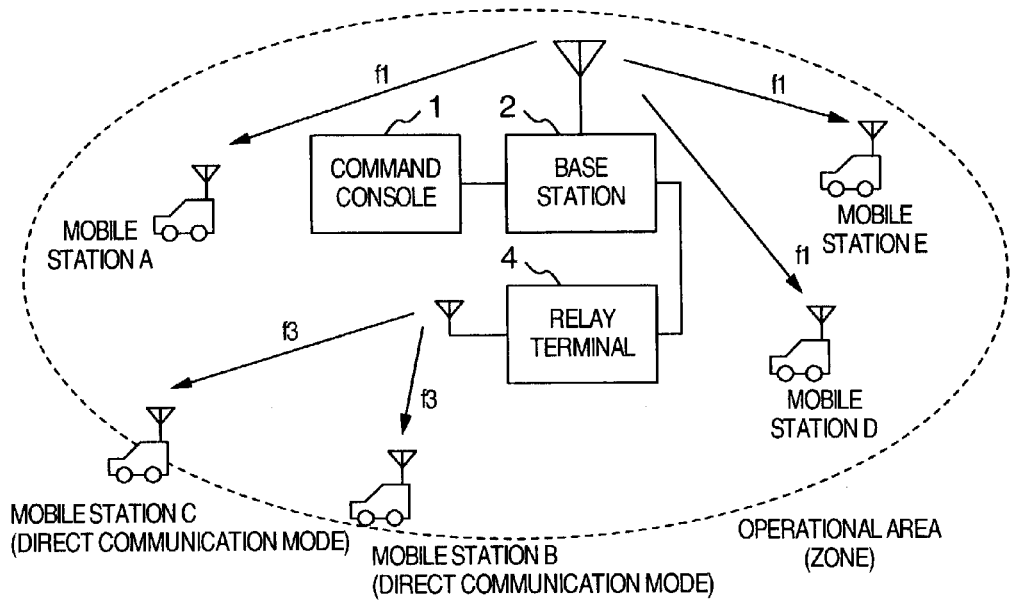
FIG. 4 is a schematic configuration diagram showing still another embodiment of a mobile communication system according to the present invention.

A mobile communication system of still another embodiment according to the present invention will now be described. FIG. 4 shows a configuration of still another embodiment according to the present invention. In this embodiment, a relay terminal 4 for conducting transmission operation by using the direct communication carrier f3 is provided in the operational area, and the relay terminal 4 is linked to the base station 2 by using wire or radio connection. The remaining configuration is the same as that of the embodiment shown in FIG. 1.

When in the simultaneous emergency call operation ordered at the command console 1 in the base station 2 an important message is transmitted from the base station by using the down-link carrier f1, the relay terminal 4 in the embodiment shown in FIG. 4 functions to be supplied with the same message via the above described link and transmit the same message by using the direct communication carrier f3.

In the case of this embodiment, it is a matter of course that an important message is transmitted from the base station 2 by using the down-link carrier f1 in the simultaneous emergency call operation ordered at the command console 1 in the base station 2. Simultaneously therewith, however, the same message is transmitted from the relay terminal 4 as well by using the direct communication carrier f3.

In the embodiment shown in FIG. 4 as well, therefore, the important message is transmitted to a mobile station as long as the mobile station is located within the operational area, no matter whether the communication mode of the mobile station is the base station dependent mode or the direct communication mode. As a result, the simultaneous emergency call operation for all mobile stations A to E can be certainly implemented.

A hardware configuration of the relay terminal 4 can be implemented by using a configuration similar to that of the mobile station 3 shown in FIG. 1. However, the relay terminal 4 has an additional modem, which is connected to the CPU 30 and which is linked to the modem 22 of the base station 2 by using wire connection to be supplied with an important message, and the relay terminal 4 transmits the important message by using the direct communication carrier f3. The voice CODEC 34 and the MMIF 32 in the mobile station 33 may be removed.

If in the case of the embodiment shown in FIG. 4 a radio link is used between the relay terminal 4 and the base station 2 and the down-link carrier f1 is used at this time, then operation according to the communication sequence of FIG. 3 in the embodiment shown in FIG. 2 becomes possible by providing the relay terminal 4 with an ID similar to that of the embodiment shown in FIG. 2.

To be concrete, in this case, an ID specifying the relay terminal 4 is set in FIG. 3 instead of an ID specifying a mobile station which should conduct relay operation, for example, the mobile station A.

In this case as well, a hardware configuration of the relay terminal can be implemented by using a configuration similar to that of the mobile station 3 shown in FIG. 1. When an ID added to an important message that is transmitted from the base station 2 by using the down-link carrier f1 has coincided with the ID of the relay terminal 4, the CPU 30 controls the radio section 33 so as to transmit the important message by using the direct communication carrier f3. The voice CODEC 34 and the MMIF 32 in the mobile station 33 may be removed.

Figure 5:
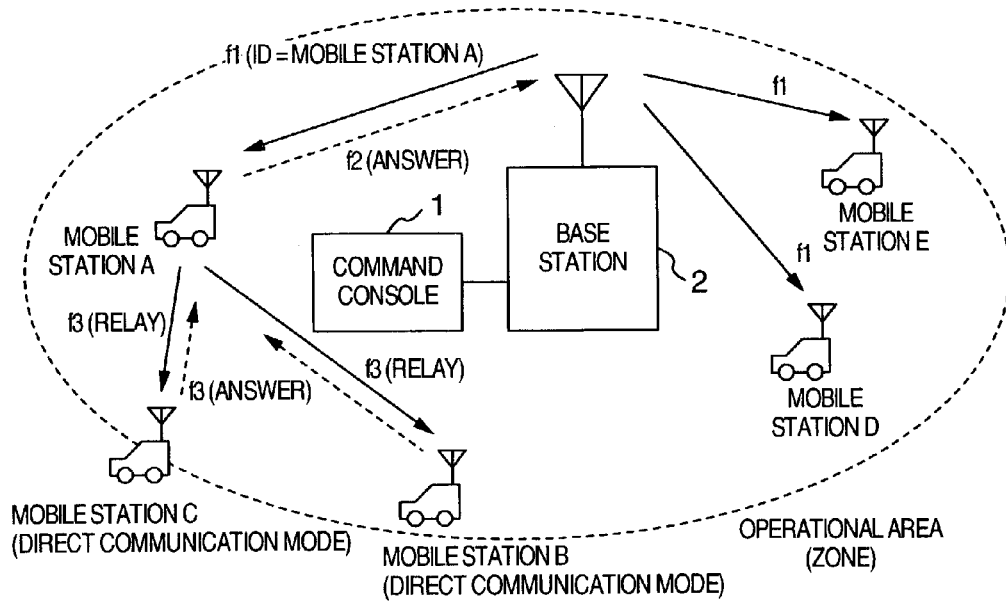
FIG. 5 is a schematic configuration diagram showing yet another embodiment of a mobile communication system according to the present invention.

FIG. 5 shows yet another embodiment of the present invention. If the simultaneous emergency call operation is conducted in the embodiment shown in FIG. 2, then in the embodiment shown in FIG. 2 an answer to the effect that the important message has been received is transmitted from a mobile station that is in the direct communication mode, such as, for example, the mobile station B or C to the mobile station A.

If an operator of each mobile station has received the simultaneous emergency call operation in the direct communication mode, then the operator returns an answer to the effect that the important message has been received, by transmission using the direct communication carrier f3. This answer is relayed to the base station 2 by using the up-link carrier f2 via the mobile station A, which is a mobile station specified by the ID.

As a result, the simultaneous emergency call operation can be made more certain. The reliability of the simultaneous emergency call can be further improved.

Reference numeral 300 in the base station 2 shown in FIG. 2 denotes a position information management section. In a scheme adopted in some recent mobile communication systems, each mobile station having the GPS (Global Positioning System) function periodically notifies the base station of position information, and the base station conducts position management of mobile stations within the operational area on the basis of the position information. When the base station in the present invention has such a position information management section 300, it is a matter of course that the simultaneous emergency call operation can be conducted more certainly and the reliability of the simultaneous emergency call can be further improved by adopting a method of determining a mobile station to be specified by using an ID, on the basis of the position information.

When transmitting an important message from the command console to all mobile stations in the operational area of the base station, it is possible, according to the above described embodiments, to notify mobile stations in the direct communication mode as well of the message.

According to the above described embodiments, therefore, a mobile radio system operating in two kinds of communication mode, i.e., the base station dependent mode and the direct communication mode can be easily applied, even in the case where simultaneous emergency call operation is needed.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A communication method for a mobile communication system having a plurality of mobile stations each capable of operating in an arbitrary one of two kinds of communication modes, including a base station dependent mode for conducting communication via a base station and a direct communication mode for conducting direct communication between mobile stations, in an operational area of the base station, the communication method comprising the steps of:

transmitting information containing an important message, to be received by all mobile stations, from the base station in the base station dependent mode, wherein when transmitting said information, said base station adds to said important message an information bit indicating that said important message is a message to be received by all mobile stations and an identifier specifying one mobile station placed in the direct communication mode;

receiving the information in said specified mobile station and in at least one first mobile station placed in the base station dependent mode;

transmitting the important message in the direct communication mode from said specified mobile station has received the information; and receiving, from said specified mobile station, the important message in at least one second mobile station placed in the direct communication mode.

2. The communication method according to claim 1, wherein in the base station dependent mode communication is conducted by using a down-link carrier and an up-link carrier whereas in the direct communication mode communication is conducted by using a direct communication carrier different from the down-link carrier and the up-link carrier.

3. The communication method according to claim 2, wherein said at least one first mobile station that have transmitted the important message notifies the base station of an answer that represents transmission completion of the important message.

4. The communication method according to claim 2, wherein each of said at least one second mobile station that have received the important message transmitted in the direct communication mode notifies said at least one first mobile station of reception completion of the important message by using the direct communication carrier.

5. The communication method according to claim 4, wherein said at least one first mobile stations that have been notified of reception completion of the important message notifies the base station of an answer that represents reception completion by using the up-link carrier.

6. The communication method according to claim 3, wherein when the base station has not received the answer from said at least one first mobile station, the base station alters the identifier to an identifier that specifies a different at least one first mobile station, and transmits the information containing the important message again by using the down-link carrier.

7. The communication method according to claim 5, wherein when the base station has not received the answer from said at least one first mobile station, the base station alters the identifier to an identifier that specifies a different at least one first mobile station, and transmits the information containing the important message again by using the down-link carrier.

8. The communication method according to claim 1, wherein said at least one first mobile station is determined based on position information of the plurality of mobile stations managed by the base station.

9. A communication method for a mobile communication system including a plurality of mobile stations each capable of operating in an arbitrary one of two kinds of communication modes, including a base station dependent mode for conducting communication via a base station and a direct communication mode for conducting direct communication between mobile stations, in an operational area of the base station, and a relay terminal radio-linked to the base station, communication is conducted by using a down-link carrier and an up-link carrier in the base station dependent mode and by using a direct communication carrier different from the down-link carrier and the up-link carrier, the communication method comprising the steps of:

transmitting information containing an important message to be received by all mobile stations, from the base station in the base station dependent mode;

wherein when transmitting said information, said base station adds to said important message an information bit indicating that said important message is a message to be received by all mobile stations and an identifier specifying said relay terminal;

receiving said information in said specified relay terminal and also in one or more first mobile stations placed in the base station dependent mode;

transmitting the important message from the relay terminal that has received the information, in the direct communication mode, using said direct communication carrier;

receiving said important message by one or more second mobile stations placed in the direct communication mode; and wherein the information containing the important message is received by the plurality of mobile stations each placed in the base station dependent mode or the direct communication mode.

10. The communication method according to claim 9, wherein the relay terminal that has transmitted the information containing the important message notifies the base station of an answer that represents transmission completion of the important message by using the up-link carrier.

11. A communication method for a mobile communication system including a plurality of mobile stations each capable of operating in an arbitrary one of two kinds of communication modes, including a base station dependent mode for conducting communication via a base station and a direct communication mode for conducting direct communication between mobile stations, in an operational area of the base station, and a relay terminal wire-linked to the base station, wherein in the base station dependent mode, communication is conducted by using a down-link carrier and an up-link carrier, whereas in the direct communication mode, communication is conducted by using a direct communication carrier different from the down-link carrier and the up-link carrier, the communication method comprising the steps of:

transmitting information containing an important message to be received by all mobile stations from the base station in the base station dependent mode, using the down-link carrier;

supplying the relay terminal as well with the information containing the important message from the base station, wherein when supplying said information to said relay terminal, said base station adds to said important message an information bit indicating that said important message is a message to be received by all mobile stations;

transmitting the information containing the important message from the relay terminal that has received the information, in the direct communication mode using the direct communication carrier;

receiving the important message by one or more first mobile stations placed in the base station dependent mode;

receiving the important message by one or more second mobile stations placed in the direct communication mode, wherein the important message is received by the plurality of mobile stations each placed in the base station dependent mode or the direct communication mode.

12. A mobile communication system, comprising:
a command console;
a base station connected to said command console to transmit information supplied from said command console; and
a plurality of mobile stations each having two kinds of communication modes, including a base station dependent mode for conducting communication via a base station and a direct communication mode for conducting direct communication between mobile stations, and capable of operating in an arbitrary one of the modes in an operational area of the base station,
wherein said base station includes a control unit for adding to an important message contained in the information supplied from said command console additional information including an information bit that indicates that the information supplied from said command console contains an important message to be transmitted to all mobile stations, and an identifier for specifying a specific mobile station and transmitting resultant information;
wherein each of the plurality of the mobile stations is so configured to, if specified by the received information, transmit the important message contained in the received information, in the direct communication mode,
wherein the specified specific mobile station included in the plurality of mobile stations, placed in the base station dependent mode, transmits the received information in the direct communication mode, and
wherein all of the mobile stations included in the operational area of the base station and each placed in the direct communication mode or the base station dependent mode receive the information.

13. The mobile communication system according to claim 12, wherein each of said plurality of mobile stations comprises:
a control unit for transmitting the important message contained in the information supplied from said base station in the direct communication mode, when the information supplied from said base station has the information bit and an identifier specifying the own station added thereto.

14. The mobile communication system according to claim 12, wherein in the base station dependent mode, communication is conducted by using a down-link carrier and an up-link carrier, whereas in the direct communication mode, communication is conducted by using a direct communication carrier different from the down-link carrier and the up-link carrier.

15. The mobile communication system according to claim 12, wherein said base station comprises:
a management unit for managing position information of said mobile stations, and specifying a specific mobile station based on the position information.

16. A mobile communication system, comprising:
a command console;
a base station connected to said command console to transmit information supplied from said command console;
a plurality of mobile stations each having two kinds of communication modes, including a base station dependent mode for conducting communication via a base station and a direct communication mode for conducting direct communication between mobile stations, and capable of operating in an arbitrary one of the modes, in an operational area of the base station; and
a relay device radio-linked to said base station to transmit an important message in the direct communication mode when the information supplied from said base station contains the important message,
wherein in the base station dependent mode, communication is conducted by using a down-link carrier and an up-link carrier, whereas in the direct communication mode, communication is conducted by using a direct communication carrier different from the down-link carrier and the up-link carrier, and said relay device is linked to said base station by using the down-link carrier,
wherein said base station includes a unit for adding to the important message contained in the information an information bit that indicates that the information contains an important message to be transmitted to all mobile stations and an identifier for specifying said relay device, when transmitting the information containing the important message by using the down-link carrier; and
wherein all of the mobile stations included in the operational area of the base station and each placed in the direct communication mode or the base station dependent mode receive the important message.

17. A mobile communication system, comprising:
a command console;
a base station connected to said command console to transmit information supplied from said command console;
a plurality of mobile stations each having two kinds of communication mode, including a base station mode for conducting communication via a base station and a direct communication mode for conducting direct communication between mobile stations, and capable of operating in an arbitrary one of the modes, in an operational area of the base station; and
a relay device wire-linked to said base station to transmit an important message in the direct communication mode when the information supplied from said base station contains the important message,
wherein in the base station dependent mode, communication is conducted by using a down-link carrier and an up-link carrier, conducted by using a direct communication carrier different from the down-link carrier and the up-link carrier;

wherein said base station includes a control unit for adding to the important message an information bit that indicates that the information contains an important message to be transmitted to all mobile stations and supplying resultant information to said relay device, when transmitting the information containing the important message by using the down-link carrier, and wherein all of the mobile stations included in the operational area of the base station and each placed in the direct communication mode or the base station dependent mode receive the important message.

* * * * *